United States Patent
Yamamoto

(10) Patent No.: US 6,773,175 B2
(45) Date of Patent: Aug. 10, 2004

(54) METHOD OF GENERATING COLOR CONVERSION TABLE OF HIGH ACCURACY, COLOR CONVERSION METHOD, AND COLOR CONVERSION PROGRAM

(75) Inventor: Toshitsugu Yamamoto, Takatsuki (JP)

(73) Assignee: Minolta Co., Ltd., Osaka (JP)

( * ) Notice: Subject to any disclaimer, the term of this patent is extended or adjusted under 35 U.S.C. 154(b) by 39 days.

(21) Appl. No.: 10/164,958

(22) Filed: Jun. 6, 2002

(65) Prior Publication Data
US 2003/0019381 A1 Jan. 30, 2003

(30) Foreign Application Priority Data

Jun. 8, 2001 (JP) ........................................ 2001-174547
Jun. 8, 2001 (JP) ........................................ 2001-174548

(51) Int. Cl.$^7$ ................................................ B41J 5/30
(52) U.S. Cl. ............................ 400/61; 400/62; 358/1.9; 358/523
(58) Field of Search ................................ 101/483–486; 400/60, 61, 62, 70, 76; 358/1.1–1.9, 2.1, 518, 523

(56) References Cited

U.S. PATENT DOCUMENTS

| | | | | |
|---|---|---|---|---|
| 5,786,908 A | * | 7/1998 | Liang | 358/518 |
| 5,982,990 A | * | 11/1999 | Gondek | 358/1.9 |
| 6,268,930 B1 | * | 7/2001 | Ohta et al. | 358/1.9 |
| 6,323,969 B1 | * | 11/2001 | Shimizu et al. | 358/523 |

FOREIGN PATENT DOCUMENTS

| | | |
|---|---|---|
| JP | 10-084487 A | 3/1998 |
| JP | 10-258548 A | 9/1998 |
| JP | 10-290375 A | 10/1998 |

* cited by examiner

Primary Examiner—Minh H Chau
(74) Attorney, Agent, or Firm—Sidley Austin Brown & Wood LLP

(57) ABSTRACT

The CMY axes are taken radialy about an origin on a plane. By this plane, a color represented using two colors among CMY can be expressed. A space is generated by adding a K axis perpendicular to the CMY plane. The color in this space is a color having black added to the color of the generated CMY plane. The required color is covered in this space. Color conversion is conducted with a table in which a point on this space and the L*a*b* space are set in correspondence.

9 Claims, 17 Drawing Sheets

(A) CMY PLANE (B) THE K AXIS IS ADDED TO THE CMY PLANE FOR A COLOR SOLID. (K AXIS IS PERPENDICULAR TO CMY PLANE) ALL COLORS CAN BE REPRESENTED BY ONE POINT ON THIS COLOR SOLID.

(A) CMY PLANE (B) THE K AXIS IS ADDED TO THE CMY PLANE FOR A COLOR SOLID. (K AXIS IS PERPENDICULAR TO CMY PLANE) ALL COLORS CAN BE REPRESENTED BY ONE POINT ON THIS COLOR SOLID.

FIG. 3

TABLE B GENERATION

GENERAL CMYK CONVERSION

SUBJECTED TO UCR

CONVERSION OF GCR 100%

SATURATION →  DISTORTED SPACE

SATURATION →  DISTORTED SPACE

Lab SPACE

→ SATURATION

LIGHTNING ROD EFFECT

METHOD OF GENERATING COLOR CONVERSION TABLE OF HIGH ACCURACY, COLOR CONVERSION METHOD, AND COLOR CONVERSION PROGRAM

This application is based on applications Nos. 2001-174547 and 2001-174548 filed in Japan, the entire content of which is hereby incorporated by reference.

BACKGROUND OF THE INVENTION

1. Field of the Invention

The present invention relates to a color conversion table generation method, a color conversion method, and a color conversion program. Particularly, the present invention relates to a color conversion table generation method, a color conversion method, and a color conversion program to convert color data represented by a certain color space into color data represented by another color space.

2. Description of Related Art

In order to achieve correct color reproduction on a printer, it is necessary to obtain the correct values of CMYK (Cyan, Magenta, Yellow and Black) that can represent an applied color (for example, L*a*b* that does not depend on the apparatus).

The most conventional CMYK conversion generally effected is CMY conversion+GCR (Gray Component Replacement) (or UCR (Under Color Removal)). This includes the processes of, as shown in FIG. 28, converting color data (L*a*b*) into the three colors of CMY, generating K data from the CMY data, and correcting the CMY data from the produced K data.

This conversion method is widely employed due to the fact that conversion to CMY can be conducted easily, and that a moderate image quality can be readily achieved by just adding black to the region of low lightness.

However, various problems are noted as set forth below when color conversion is conducted according to the conventional method.

The color reproduction range by CMY is smaller than the color reproduction range of CMYK (for example, by the combination of the three colors of CMY, umber brown is achieved instead of black). Therefore, in the conversion process from L*a*b* to CMY, there are some colors that cannot be represented by CMY even if reproduction in CMYK is allowed.

As to correcting the values of CMY based on the produced K data, it is difficult to identify the K component amount in CMY, and determine how much the CMY is to be corrected when K data is produced since the actual ink property is complex. In practice, conversion is carried out empirically (or by trial and error).

Also, in the case where an image on a display is to be printed out through a printer in a computer system, the RGB (Red, Green and Blue) signal output with respect to the display must be converted into the CMYK (Cyan, Magenta, Yellow and Black) signal employed for the printer output. Since both the RGB signal of the display and the CMYK signal of the printer depend on the property of the apparatus, it is necessary to first represent colors with the colorimetric system that does not depend on the property of the apparatus for the purpose of achieving accurate color conversion.

Specifically, the RGB signal is converted into the colorimetric system such as L*a*b* that does not depend upon the property of the apparatus, and then further converted into the CMYK signal.

In general, the color range that can be reproduced differs between a display and a printer. Therefore, an operation of substituting a color that cannot be represented through the printer with a color that can be represented (gamut compression) is necessary.

The conventional technique of gamut conversion is disclosed in, for example, Japanese Patent Laying-Open No. 10-84487. This method effects conversion so that the color difference between color data of the image prior to conversion and the color data of the image after conversion is reduced.

FIG. 29 is a diagram to describe a specific method of gamut compression. The L*a*b* space is viewed from the direction of the L* axis. The hatched region in FIG. 29 represents the gamut.

In the case where image data that is to be represented is located at the initial point of the arrow in FIG. 29, that data must be converted into data residing in the gamut since the data is located outside the gamut. Here, a color that cannot be reproduced is converted into a reproducible color by shifting the image data from the initial point of the arrow to the end point of the arrow.

In order to minimize the color difference, the end point of the arrow is set so that the distance from the initial point to the end point of the arrow is as short as possible.

In the above-described gamut compression method, problems called "blue-shift" and "lightning rod effect" are noted. Blue-shift is a phenomenon in which the color of bright blue outside the gamut is converted into the color of purple that has small color difference instead of the desirable conversion biased towards cyan. The lightning rod effect is a phenomenon in which data after conversion is congregated at the acute area of the gamut.

Various methods have been proposed to avoid such problems (for example, refer to Japanese Patent Laying-Open Nos. 10-258548 and 10-290375).

However, these methods require the accurate determination of the boundary of the gamut. The process inside the gamut and the process outside the gamut are independent of each other, so that the amount of calculation is increased. Furthermore, although appropriate conditions of constraint must be set so that there is no discontinuity in the data inside the gamut and outside the gamut, this setting is extremely difficult since the boundary plane to which the constraint condition is to be assigned is a three dimensional free-form surface.

SUMMARY OF THE INVENTION

An object of the present invention is to provide a color conversion table generation method, a color conversion method, a color conversion program, and an image processing apparatus that can effect better color reproduction without having to depend on empirical rules or trial and error.

Another object of the present invention is to provide a color conversion table generation apparatus and color conversion apparatus that can effect conversion readily and of enhanced appearance.

According to an aspect of the present invention, a color conversion table generation method includes the steps of: (a) printing out a plurality of colors determined in a color space formed of a plane indicating a cyan component and a magenta component, a plane indicating a magenta component and a yellow component, a plane indicating a yellow component and a magenta component, and a gray component that is not in parallel with any of these planes; (b)

reading out color of each color printed out at step (a); and generating a table in which each colorimetric result obtained at step (b) and each color determined on the color space are in correspondence.

According to another aspect of the present invention, a color conversion table generation apparatus includes a printer for printing out a plurality of colors determined in a color space formed of a plane indicating a cyan component and a magenta component, a plane indicating a magenta component and a yellow component, a plane indicating a yellow component and a cyan component, and a gray component that is not in parallel with any of these planes; a colorimetry portion for reading out color of each color printed out at the printer; and a table generation portion for generating a table in which each colorimetric result obtained at the colorimetry portion and each color printed out by the printer and determined on the color space are in correspondence.

According to a further aspect of the present invention, a color conversion method conducts color conversion using a table in which each point of a first color space and each point of a second color space are set in correspondence. The first color space can represent a color not depending on the apparatus. The second color space is formed of a plane indicating the cyan component and the magenta component, a plane indicating the magenta component and the yellow component, a plane indicating the yellow component and the magenta component, and a gray component that is not in parallel with any of these planes.

According to still another aspect of the present invention, a color conversion apparatus includes a color conversion portion for color conversion using a table in which each point in a first color space and each point in a second color space are set in correspondence. The first color space can represent a color not depending on the apparatus. The second color space is formed of a plane indicating the cyan component and the magenta component, a plane indicating the magenta component and the yellow component, a plane indicating the yellow component and the magenta component, and a gray component that is not in parallel with any of these planes.

According to a still further aspect of the present invention, an image processing apparatus forming an image that is to be printed out with a black colorant and a plurality of color colorants includes an image processing portion for increasing the usage amount of at least one color colorant among the plurality of color colorants with the usage amount of the black colorant the same as the color that is to be represented becomes blacker in order to represent a blacker color from a state where the usage amount of the black colorant is at its maximum.

According to yet a further aspect of the present invention, an image processing method forms an image to be printed out with a black colorant and a plurality of color colorants. In order to represent a blacker color from the state where the usage amount of the black colorant is at its maximum, the usage amount of at least one type of color colorant among the plurality of color colorants is gradually increased with the usage amount of the black colorant the same as the color to be represented becomes blacker.

According to yet another aspect of the present invention, a color conversion table is used in an image processing apparatus to form an image to be printed out with a black colorant and a plurality of color colorants. The color conversion table stores information to gradually increase the usage amount of at least one type of color colorant among the plurality of color colorants with the usage amount of the black colorant the same as the color to be represented becomes blacker, in order to represent a blacker color from the state where the usage amount of the black colorant is at its maximum.

According to yet a still further aspect of the present invention, a color conversion table generation apparatus includes an output portion for providing a plurality of types of colors using color data in a first space; an acquirement portion for acquiring color data in a second color space of each output color by reading out color of each color output from the output portion; a conversion portion for conducting conversion to deform the second color space on the acquired color data; and a generation portion for generating a table in which the output color data of the first color space and the color data converted by the conversion portion are in one-to-one correspondence.

According to an additional aspect of the present invention, a color conversion table generation method includes the steps of: (a) providing a plurality of types of colors using color data in a first color space; (b) acquiring color data in a second color space of each output color by reading out color of each color output at step (a); (c) carrying out a conversion to deform the second color space on the color data acquired at step (b); and (d) generating a table in which color data of the first color space output at step (a) and color data converted at step (c) are in one-to-correspondence.

According to still an additional aspect of the present invention, a color conversion apparatus includes a storage portion for storing a table indicating corresponding relationship between data of a first color space representing color depending on the apparatus and data of a second color space that is a deformation of a color space that represents a color that does not depend on the apparatus; an input portion for applying color data in the color space that does not depend upon the apparatus; a conversion portion for converting the color data applied by the input portion into color data of the second color space; and a reader portion for reading out from said storage portion data of the first color space corresponding to color data converted by the conversion portion.

According to yet a further additional aspect of the present invention, a color conversion method for color conversion using a storage portion in which is stored a table that indicates the corresponding relationship between data of a first space depending upon the apparatus and data of a second space which is a deformation of a color space that does not depend upon the apparatus includes the steps of: (a) applying color data of a color space that does not depend upon the apparatus; (b) converting the color data input at step (a) into color data of the second color space; and (c) reading out from the storage portion data of the first color space corresponding to the converted color data.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 shows a stored example of data of the CK space in a memory.

DESCRIPTION OF THE PREFERRED EMBODIMENTS

First Embodiment

Figure 1:
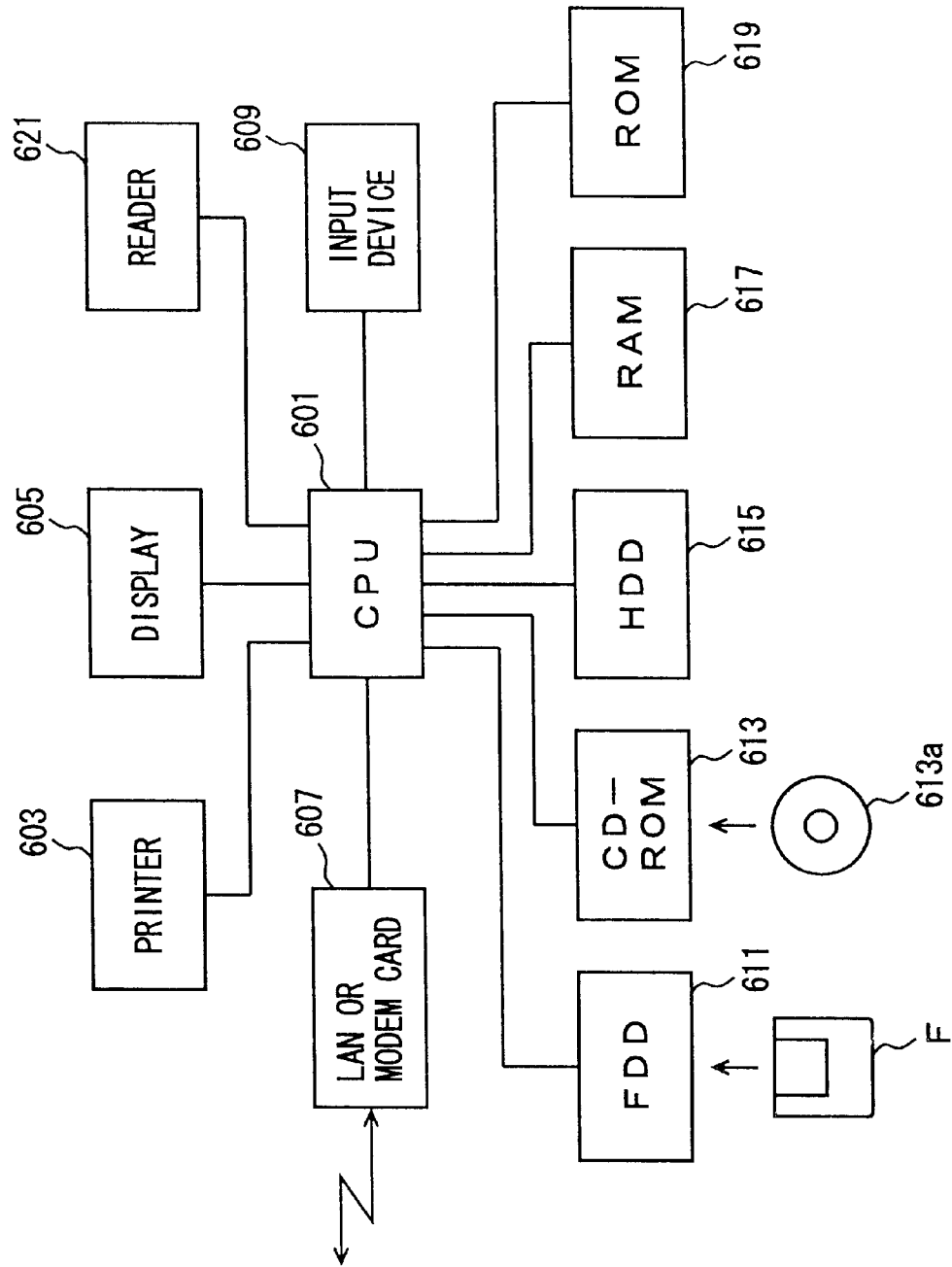
FIG. 1 is a block diagram of a structure of an image processing apparatus according to a first embodiment of the present invention.

FIG. 1 is a block diagram of a structure of an image processing apparatus according to a first embodiment of the present invention.

Referring to FIG. 1, the image processing apparatus includes a CPU 601 providing the overall control of the apparatus, a printer 603 to print out a color image subjected to color conversion, a display 605 to display a color image, a LAN or modem card 607 transferring data with an external source, an input device 609 formed of a keyboard, a mouse, or the like, a flexible disk drive 611, a CD-ROM drive 613, a hard disk drive 615, a RAM 617, ROM 619, and a reader 621 that can read out a color image.

The program to realize image data and the image processing method described afterwards can be installed in the image processing apparatus through a flexible disk F or CD-ROM 613a, or communication via a LAN or modem.

The image processing apparatus carries out the following operations (1) and (2).

(1) Generation of a table to set a CK (chroma axis black axis) space and an L*a*b* space in correspondence.

(2) Generation of an L*a*b*→CMYK color conversion table (profile) using the table generated at (1).

Since the correspondence from the L*a*b* color space to the CMYK color space is not 1:1 (1: multiple), better color reproduction could be achieved only empirically or by trial and error in conventional art.

The inventor of the present invention took the approach of arranging a three dimensional space in which a one-to-one correspondence is assigned between the CMYK space and L*a*b* space. This is because, once the one-to-one correspondence is set, L*a*b*→CMYK conversion which is an inverse transformation of CMYK→L*a*b* can be easily obtained.

The coordinate system used in arranging a CMYK space in a three dimensional space is a coordinate system that has the chroma axis extending radially about a K axis that represents black (and gray). Therefore, this three dimensional space is called CK space in the present specification.

Since the CK space has the CMYK and the L*a*b* arranged in a one-to-one correspondence, random representation can be achieved by altering the manner of arrangement (the manner of generating the CK space). Specifically, conversion in which the usage amount of K in the output image is at the maximum level to conversion in which much CMY is used instead of K can be applied at will.

Figure 2:
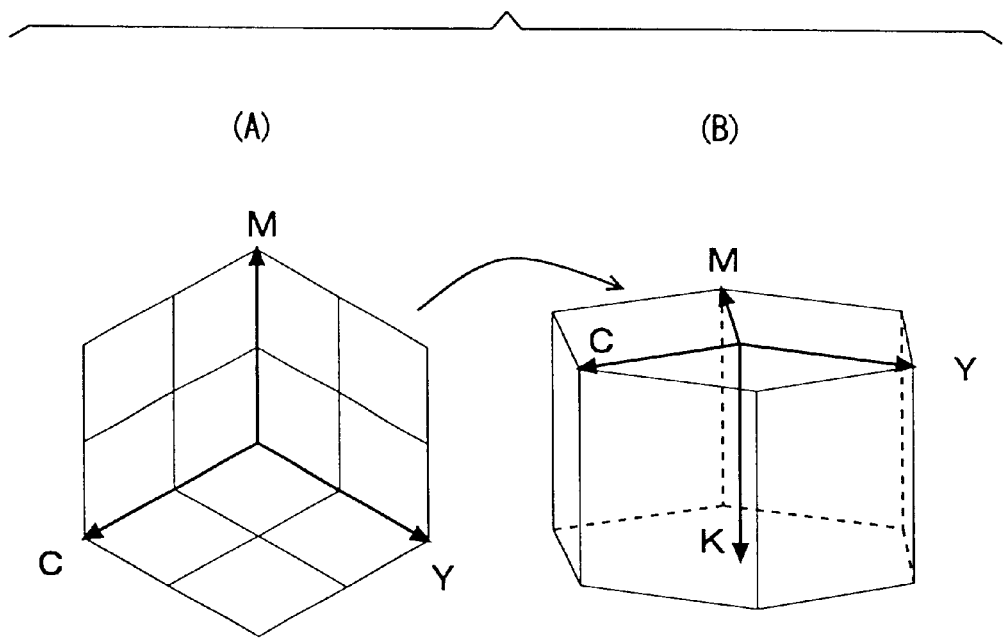
FIG. 2 represents a specific example of a CK space.

FIG. 2 is a schematic diagram of a CK space employed in the image processing apparatus of the present invention.

First, a plane is generated in CMY as shown in FIG. 2(A). Specifically, the CMY axes are taken radially about the origin on the plane. The region between the C axis and the Y axis covers colors that can be produced by the combination of C and Y. The same applies to the region between the M axis and the Y axis, and the region between the Y axis and the C axis. By this plane, all the colors that can be represented using two colors out of CMY (the so-called high key color) can be represented. The same color will not occur twice on this plane.

Here, a K axis perpendicular to the CMY plane is added to generate a three dimensional space, as shown in (B). The colors represented by the space of (B) correspond to the colors of the CMY plane generated at (A) with black added. The same color will not occur twice at different positions in the space of (B) with black at the highest level as the only exception. It is to be noted that this space covers the required colors.

Thus, a color space (CK space) that has a one-to-one correspondence with L*a*b* is generated. The corresponding relationship from the CK space to L*a*b* can be easily obtained by reading the color. Since the conversion from the CK space to L*a*b* has a one-to-one correspondence, inverse transformation (conversion from L*a*b* to CK space) can readily be obtained by various methods. In other words, the CMYK value can be immediately obtained if the coordinates in the CK space are determined.

Upon obtaining conversion from L*a*b* to CMYK based on data of a color space arranged as described above, conversion used only two colors out of CMY and K (i.e., conversion in which K is at the maximum level) is achieved. Specifically, an image will be represented by the K component (gray component), and components of C and M, components M and Y, or components of Y and C.

Figure 3:
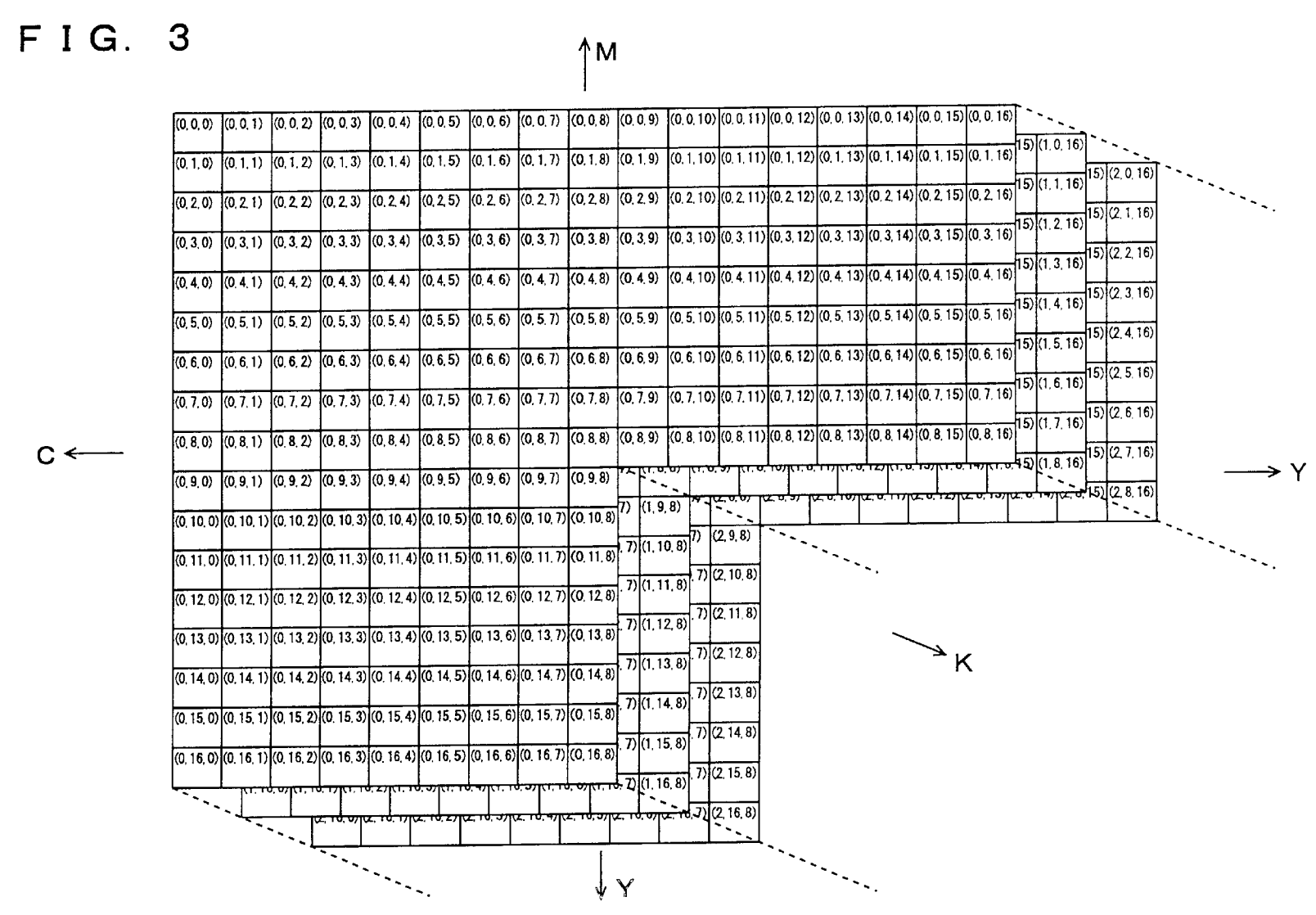

Since the calculation process will become complicated when color data is organized in a space represented by a hexagonal prism as shown in FIG. 2(B), the data is stored in the image processing apparatus as shown in FIG. 3.

FIG. 3 shows data of the CK space recorded in the image processing apparatus.

Referring to FIG. 3, it is assumed that the center is the origin of the CMY plane, wherein the M component, and the C component become higher in the upward direction and leftward direction, respectively. Similarly, the Y component becomes higher in the rightward and downward direction. The K component becomes higher in the direction towards the rear of the drawing sheet.

By organizing data as described above, the CK space can be represented in a three dimensional arrangement. Therefore, the calculation process can be simplified. In FIG. 3, the CMY axes are divided into eight in each axis direction. The accuracy of color conversion can be improved by using a larger divisor to record more data.

In the case where the data of CMYK and corresponding data of L*a*b* are stored at an arbitrary position in the arrangement as shown in FIG. 3, and L*a*b*→CMYK conversion, for example, is to be effected, the L*a*b* value closest to that L*a*b* is read out from the arrangement to obtain the CMYK data stored in that position. However, the memory size will become too large for practical usage if all the CMYK data corresponding to all L*a*b* are stored. Here, only data of predetermined interval are stored. As to reference to data in the intervals, interpolation is carried out using an interpolation expression as represented by the following equation (1).

Equation 1

$$\begin{aligned}L = &L[i][j][k]*(1-s)*(1-t)*(1-u) + \\ &L[i][j][k+1]*(1-s)*(1-t)*(u) + \\ &L[i][j+1][k]*(1-s)*(t)*(1-u) + \\ &L[i][j+1][k+1]*(1-s)*(t)*(u) + \\ &L[i+1][j][k]*(s)*(1-t)*(1-u) + \\ &L[i+1][j][k+1]*(s)*(1-t)*(u) + \\ &L[i+1][j+1][k]*(s)*(t)+(1-u) + \\ &L[i+1][j+1][k+1]*(s)*(t)*(u)\end{aligned} \quad (1)$$

The interpolation method is not limited to the linear solid interpolation in Equation (1). Another interpolation method can be used instead.

It is not necessary to totally go over the entire arrangement with respect to an applied L*a*b* (if so, a search from $(8\times16)^3\times3\approx7,000,000$ candidates will have to be conducted). Therefore, first a search is carried out based on a rough interval, and then a fine search is to be carried out in the vicinity of the roughly determined section.

Figure 4:
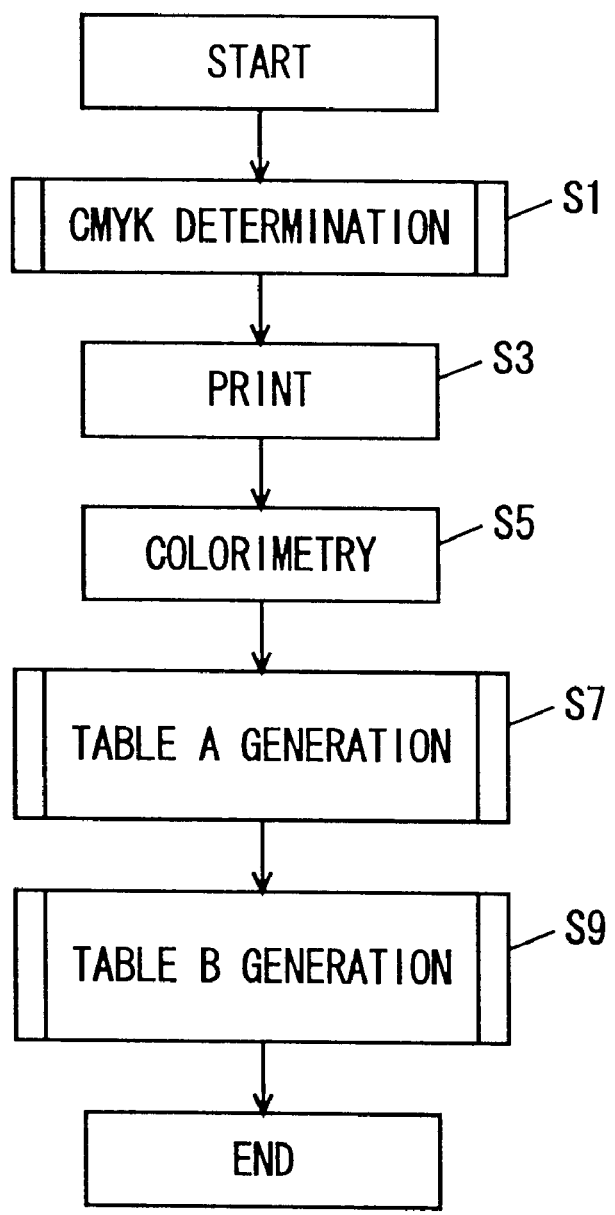
FIG. 4 is a flow chart of a color conversion table generation process.

FIG. 4 is a flow chart of a color conversion table generation process carried out by the image processing apparatus of FIG. 1.

At step S1, a plurality of CMYK values that must be subjected to colorimetry (i.e., the data to be stored in the table of FIG. 3) are determined. At step S3, color printing is effected with the determined CMYK corresponding to the ink ingredients through printer 603.

At step S5, each color printed out is measured by reader 621. At step S7, a Table A with the colorimetric result and the CMYK values in correspondence (refer to FIG. 3) is generated.

At step S9, a Table B to obtain the values of CMYK from L*a*b* based on Table A is generated.

Figure 5:
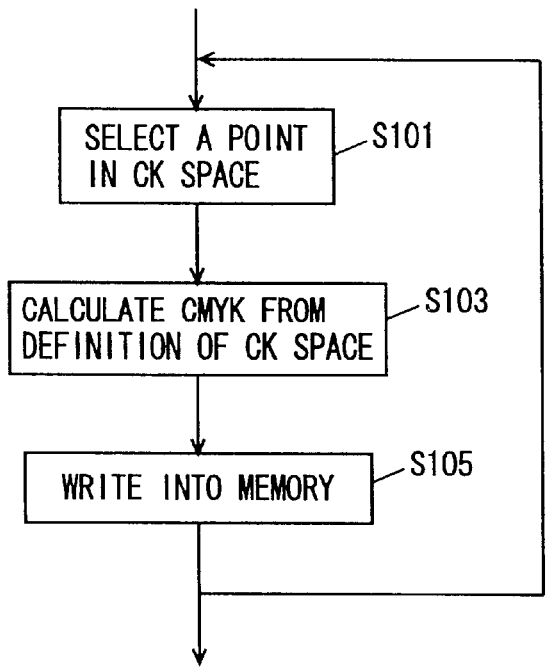
FIG. 5 is a flow chart corresponding to a CMYK determination process (S1) of FIG. 4.

FIG. 5 is a flow chart corresponding to the CMYK determination process (S1) of FIG. 4.

At step S101, a point in the CK space is selected. At step S103, the CMYK value corresponding to that selected point is calculated from the definition of CK space. At step S105, the calculated CMYK value (the color to be printed out) is written into the memory. The process from step S101 to S105 is repeatedly executed until all the required CMYK values are determined.

Figure 6:
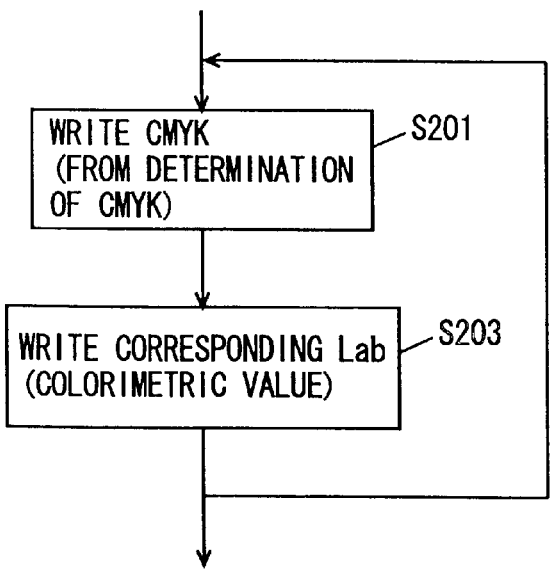
FIG. 6 is a flow chart corresponding to a Table A generation process (S7) of FIG. 4.

FIG. 6 is a flow chart corresponding to a Table A generation process (S7) of FIG. 4.

At step S201, the CMYK value of the color read out is written into a corresponding position in Table A. At step S203, the value of L*a*b* (colorimetric value) corresponding to the color represented by the current CMYK is written. The process from steps S201 to S203 is repeatedly executed until the process for all the colors is completed.

Figure 7:
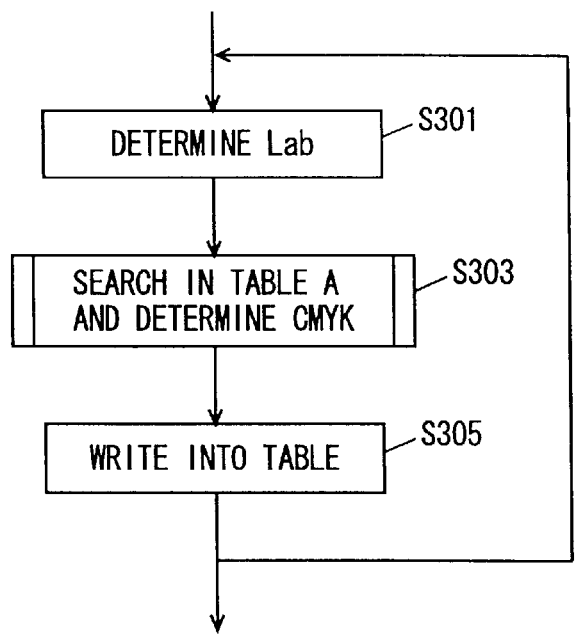
FIG. 7 is a flow chart corresponding to a Table B generation process (S9) of FIG. 4.

FIG. 7 is a flow chart corresponding to a Table B generation process (S9) of FIG. 4.

At step S301, the value of L*a*b* that is to be registered in Table B is determined. Specifically, the value of L*a*b* is determined with an appropriate interval since registration of all the L*a*b* in Table B is not preferable from the standpoint of the memory size and the like. At step S303, a search for the CMYK value corresponding to the determined L*a*b* is performed in Table A. In the case where there is not a corresponding L*a*b* directly, the CMYK value is determined by employing interpolation calculation.

At step S305, the value of L*a*b* and the value of CMYK are written into Table B.

Thus, a table for conversion from L*a*b* to CMYK is generated.

Figure 8:
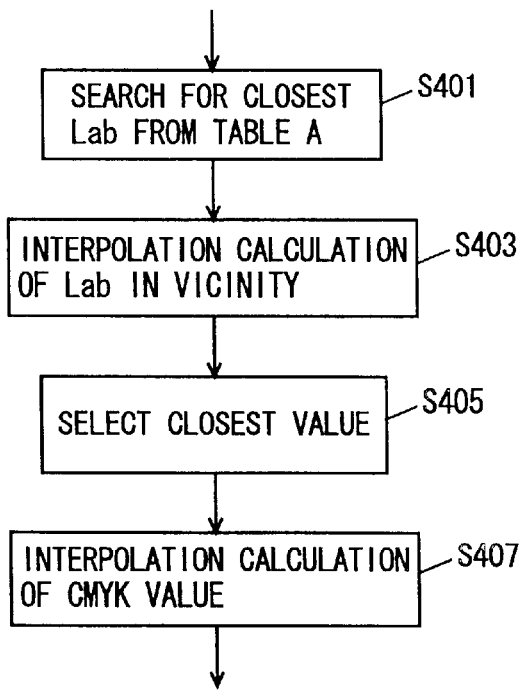
FIG. 8 is a flow chart corresponding to a CMYK determination process (S303) of FIG. 7.

FIG. 8 is a flow chart corresponding to a CMYK value determination process carried out at step S303 of FIG. 7.

At step S401, the closest L*a*b* value is searched for in Table A. At step S403, the L*a*b* value in the vicinity is subjected to interpolation calculation. At step S405, the most approximating value is selected. At step S407, the CMYK value is subjected to interpolation calculation.

Figure 9:
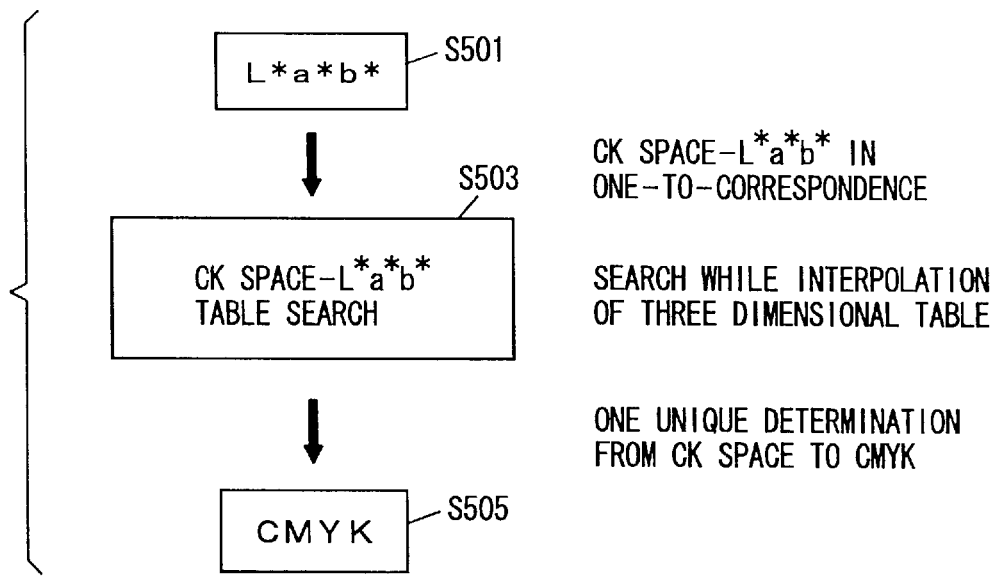
FIG. 9 is a flow chart of a color conversion process according to the first embodiment.

FIG. 9 is a flow chart corresponding to a color conversion process carried out by the image processing apparatus of FIG. 1.

At step S501, the L*a*b* value is input. At step S503, a search is performed in Table B generated according to the process of FIG. 4 to calculate the corresponding position in CK space. At step S505, the value of each component of CMYK is calculated based on the position in the CK space.

The advantages obtained by the method of the present embodiment are set forth below.

(1) In contrast to the conventional art, the process of first converting into CMY for color conversion is omitted. All colors are directly converted into CMYK values based on actually measured values. Therefore, the know-how of the CMY correction process (such as UCR) after K data generation that was conventionally required is no longer necessary.

(2) In the present embodiment, the image output from the printer with respect to an input of "black" does not always correspond to the black toner (K component) of 100%. This is because a blacker color can be represented by superimposing another color as compared to the black obtained from 100% black toner.

(3) Since the color closest to the input color is searched for from the table in the color conversion process, a more accurate color conversion can be carried out.

It is to be noted that the picture quality of the image after color conversion will be degraded with respect to L*a*b* outside the gamut space unless some CMYK is taken in correspondence. In the present embodiment, mapping is carried out automatically without discrimination between the value inside and outside the gamut by searching for an L*a*b* closest to the input L*a*b* from the table in color conversion.

In the present invention, the K ink does not necessarily have to be achromatic. In response to an input of an achromatic color, an appropriate amount of CMY ink is added to output the CMYK value corresponding to the achromatic color even if the K ink is not achromatic as long as inverse transformation is carried out appropriately.

Second Embodiment

The color output as a result of color conversion corresponds to the conversion using only two colors out of CMY and K (=K maximum conversion) in the above first embodiment. The second embodiment is directed to conversion with the amount of CMY increased by devising the K axis.

Figure 10:
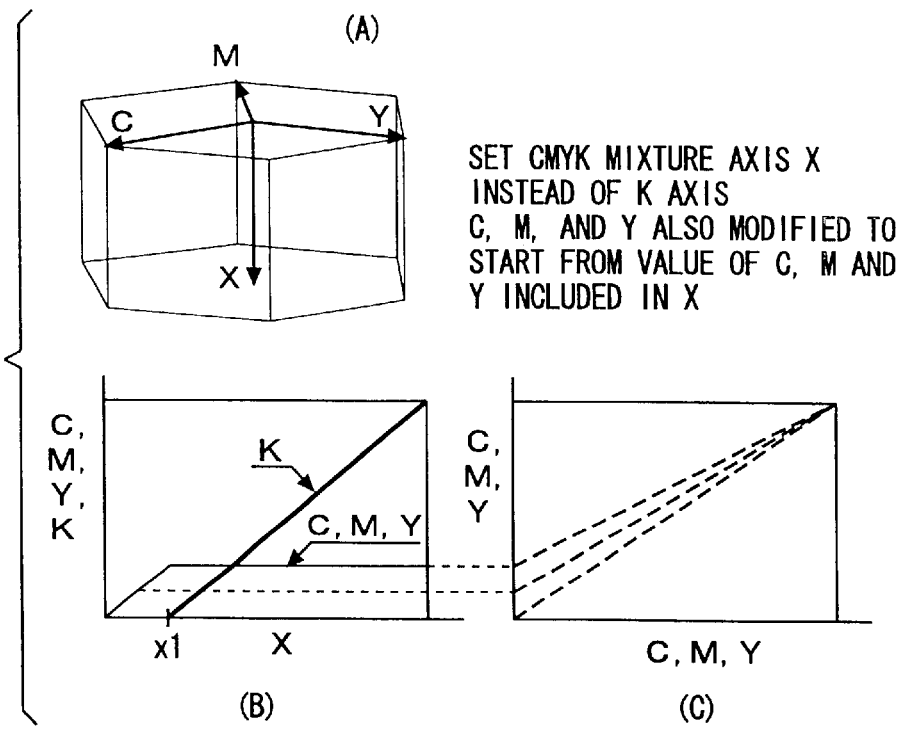
FIG. 10 shows a CK space employed in an image processing apparatus according to a second embodiment of the present invention.

FIG. 10 is a diagram to describe the concept of the CK space in the second embodiment. As shown in (A), the X axis is employed in the second embodiment instead of the K axis of FIG. 2(B). The X axis has respective components of CMYK mixed. The mixing ratio is shown in (B). Specifically, at the region where the X value is close to 0, each amount of C, M and Y is set equal. The value of each component is increased as a function of a larger X (as a result, the output is gray). At positions of x1 and et seq. for the X value, the value of K is increased linearly with each value of CMY not altered.

Each value of CMY is increased as a function of distance from the X axis as shown in (C). It is assumed that the initial value is set to match the CMY value of (B). Accordingly, the CMY value will increase linearly as a function of distance from the X axis from any point on the X axis.

A certain point on the X axis represents a certain combination of CMYK in the present embodiment. This combination is set so as to substantially represent gray, and the darkness of the color increases in monotony with respect to the value of X. As the point becomes more distant from the X axis, the values of CMY will gradually increase starting from the value of the CMY on the X axis. Thus, all colors can be covered in the CK space by a reason identical to that of the first embodiment. The same color will not occur twice in the CK space.

Although it is important that the darkness of the color increases in monotony with respect to the value of X, it is not so important that the color matches gray. This is because, even if the color on the X axis deviates from gray, the proper color will be reproduced as long as inverse transformation is conducted appropriately.

Advantage of Embodiments

Figure 11:
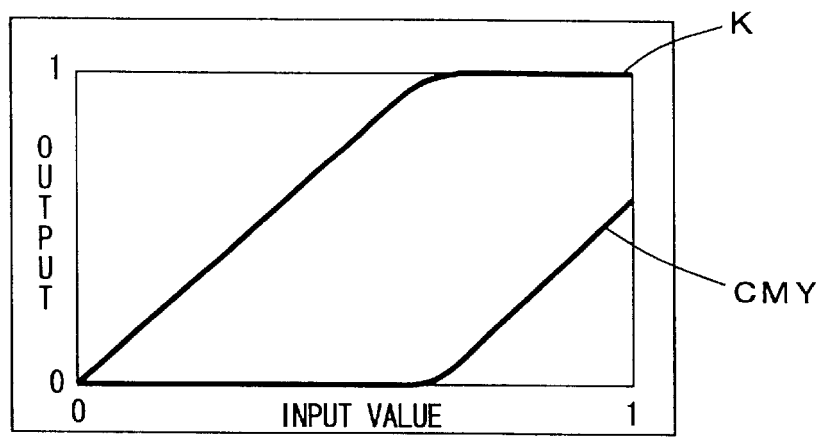
FIGS. 11 and 12 show the advantages of the first and second embodiments, respectively.

FIG. 11 is a graph representing the amount of the ink components employed in the output image when the input value changes from white (0) to black (1) in the first embodiment.

A blacker color can be represented by further adding the colors of CMY instead of using 100% black ink. Therefore, the black reproduction range becomes smaller if the usage amount of color ink is reduced and the usage amount of black ink is increased. If the black reproduction range is to be maintained, the usage amount of ink will be increased.

When the usage amount of black ink (K) reaches its peak in the present embodiment, the amount of CMY ink is increased in order to represent a blacker color as shown in FIG. 11. In order to represent a blacker color from the state where the usage amount of black is at its maximum, control is provided so that the usage amount of color ink is increased with the usage amount of black ink the same as a function of a blacker level of the color to be reproduced.

Accordingly, a wide black reproduction range can be achieved while the usage amount of ink is minimized.

Figure 12:
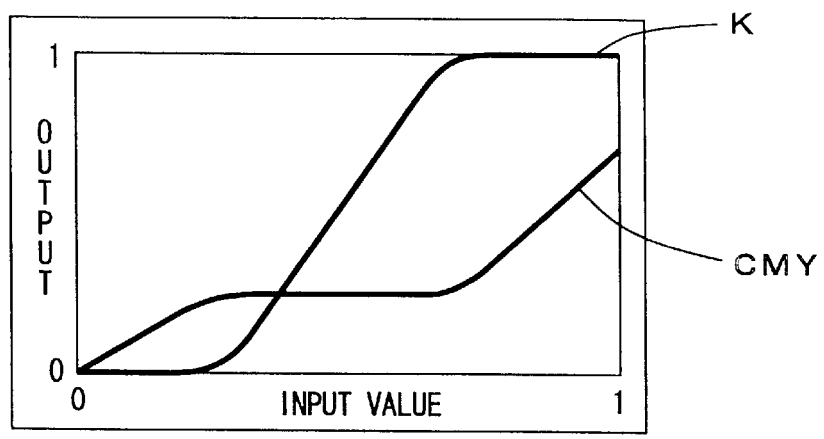

FIG. 12 is a graph representing the amount of CMY ink and the amount of K ink when the input value changes from white to black in the color conversion process of the second embodiment. As shown in FIG. 12, when a further black color is to be represented at a state where the usage amount of black ink is at its maximum level, the usage amount of color ink is increased while the usage amount of a black ink is the same in the present embodiment. Accordingly, a wider black reproduction range can be achieved while suppressing the amount of ink to be used at its minimum in the second embodiment.

Figure 13:
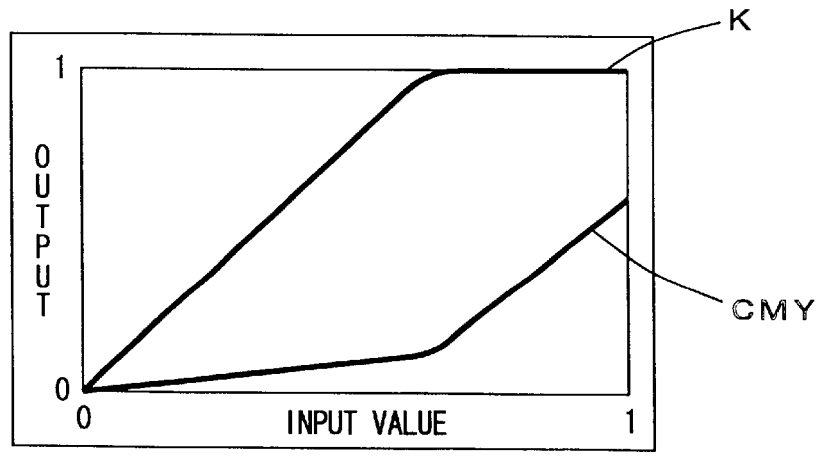
FIG. 13 shows a process in a modification.

In the case where the usage amount of color ink is increased with the usage amount of black ink the same in order to represent a further black color in a state where the usage amount of black ink is at its maximum, the process as shown in FIG. 13 can be employed.

Figure 14:
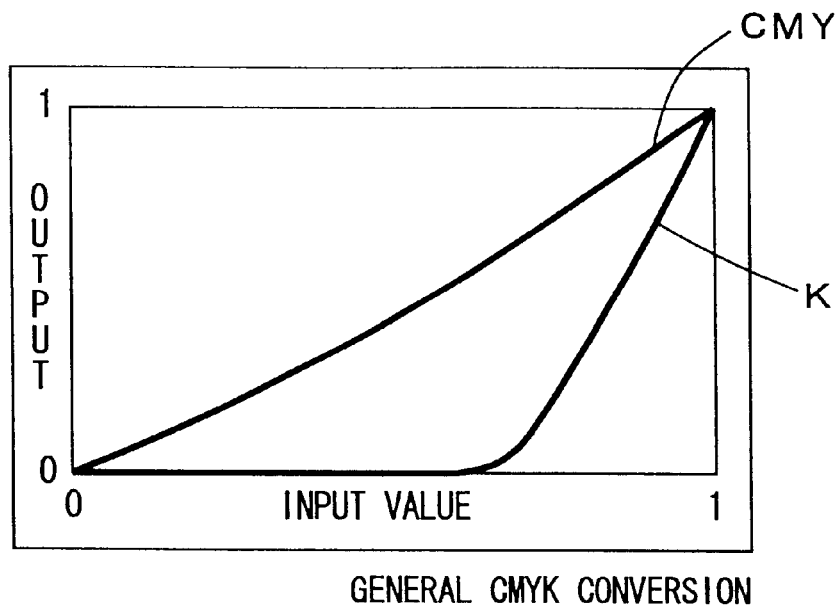
FIG. 14 shows a conventional CMYK conversion process.

FIG. 14 is a graph representing the relationship between the input value and the usage amount of ink in the conventional conversion process into CMYK. It is appreciated from FIG. 14 that a color is represented by only CMY in a gray state where the input value is near white in the conventional method. When the input value exceeds a predetermined value, the black color is represented with K ink. There is a problem that a large amount of ink will be used in this conventional method.

Figure 15:
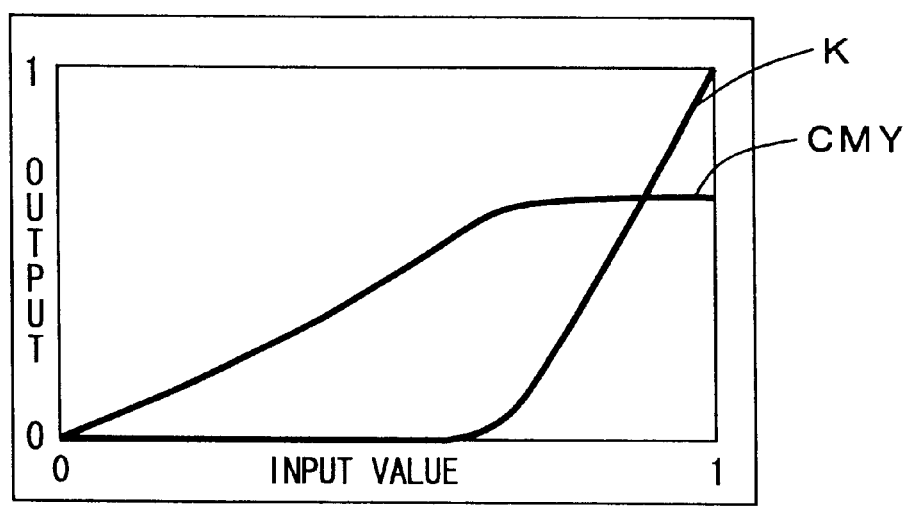
FIG. 15 shows a CMYK conversion subjected to UCR.

FIG. 15 is a graph representing the state where UCR is subjected to image processing from the state of FIG. 14. When the value of CMY reaches a certain level, black is increased by K ink. Although the usage amount of ink can be reduced than that of FIG. 14, the color reproduction range will become smaller.

Figure 16:
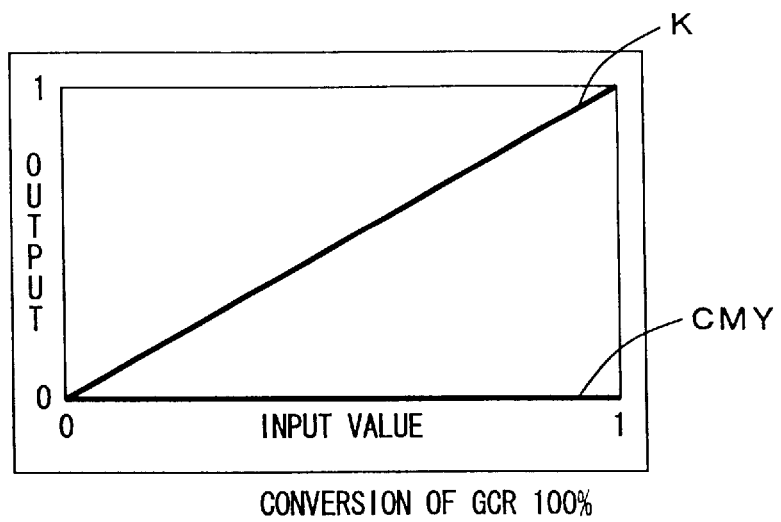
FIG. 16 shows a conversion process of GCR 100%.

FIG. 16 is a graph representing the state where image processing is implemented with GCR 100% from the state of FIG. 14.

It is appreciated from FIG. 16 that CMY ink is not used to represent black (gray). The black and gray colors are represented with K ink alone. Although the amount of used ink can be reduced, the color reproduction range will become smaller.

Although the CMY axes are set on the same plane in the above-described embodiments, the present invention is not limited thereto.

Figure 17:
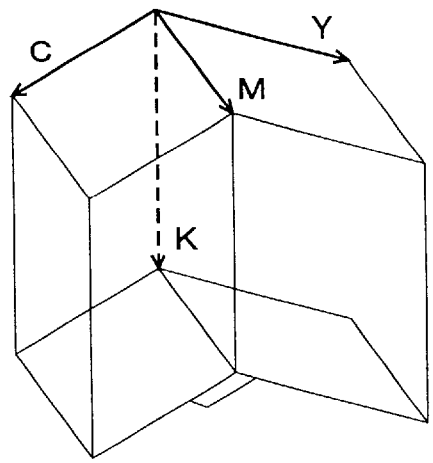
FIGS. 17 and 18 show first and second modifications, respectively, of the CK space.

Specifically, a CK space can be generated even if the three axes of CMY are directed in independent directions as shown in FIG. 17.

Figure 18:
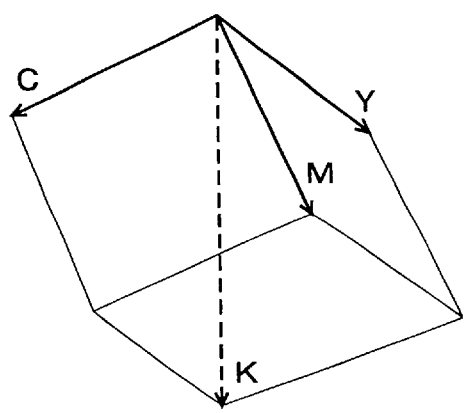

It is noted that, the more black, the smaller change in color when another color is added. Therefore, the reduction scale can be reduced to generate a CK space as shown in FIG. 18. In the case where the printed out color can be perceived as black regardless of the amount of other inks when the usage amount of black color ink is at its maximum, i.e. when black color ink has sufficient covering property, the entire solid of the CK space can be set as a rectangular solid. By dividing the point that is to be color-measured along this rectangular solid, the K axis will always take the vertex of the divided rectangular solid, which is convenient for interpolation calculation. There is also an advantage that equableness is improved when viewed in the L*a*b* space.

Third Embodiment

Figure 19:
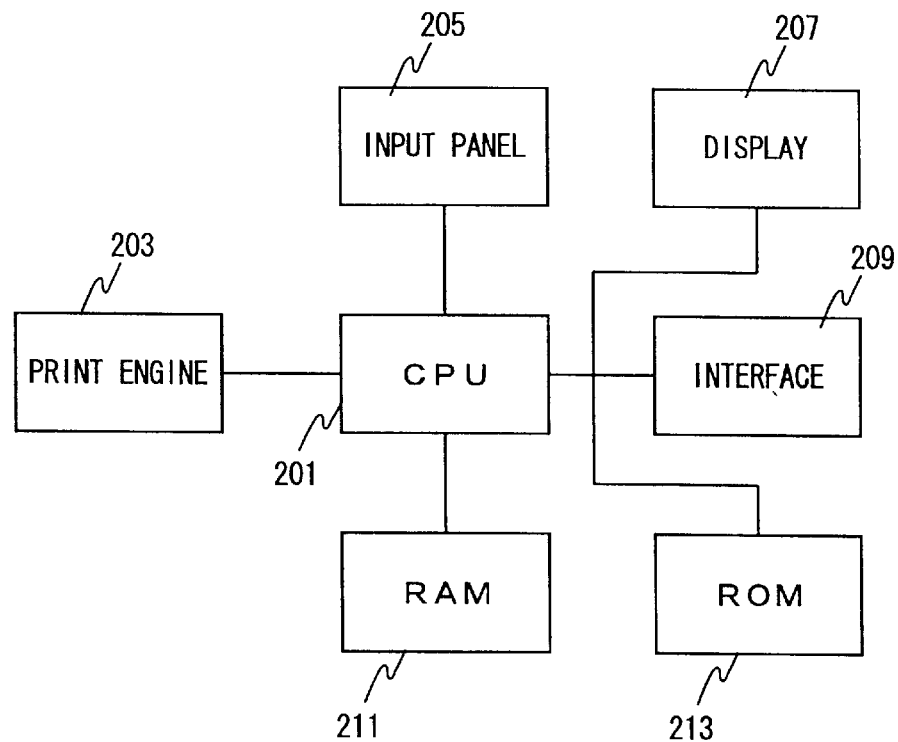
FIG. 19 shows the hardware structure of a printer according to a third embodiment.

FIG. 19 is a black diagram showing a hardware structure of a printer according to a third embodiment of the present invention.

Referring to FIG. 19, the printer includes a CPU 201 providing the overall control of the apparatus, a print engine 203 to conduct printing, an input panel 205 to receive input from a user, a display 207 to provide a display, an interface 209 to input externally applied image data, a RAM 211 for the temporary storage of data, and a ROM 213 for recording programs, constants and the like.

The printer of the present embodiment provides a printout of a color image by employing the color conversion process of the first or second embodiment.

Fourth Embodiment

The structure and operation of an image processing apparatus according to a fourth embodiment of the present invention are similar to those described with reference to FIGS. 1–5.

Figure 20:
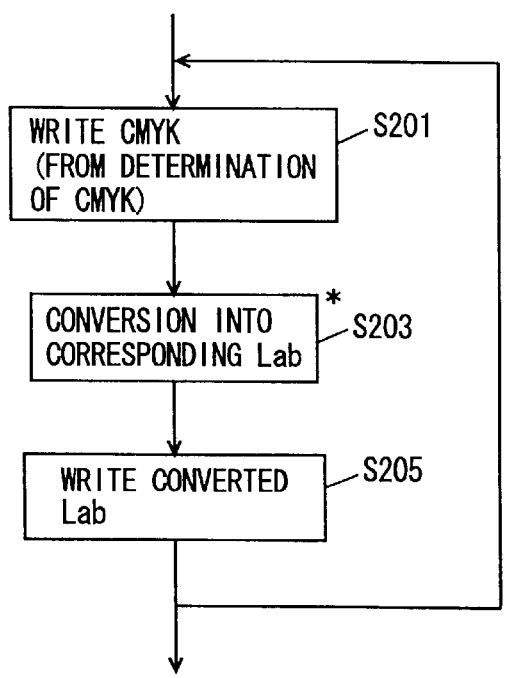
FIG. 20 is a flow chart corresponding to a Table A generation process (S7) of FIG. 4 according to a fourth embodiment.

FIG. 20 is a flow chart corresponding to the Table A generation process (S7) of FIG. 4 according to the fourth embodiment.

At step S201, the CMYK value of the color read out is written into an appropriate position in Table A. At step S203, the value of the color-measured $L^*a^*b^*$ is converted. This conversion is required for deformation of the $L^*a^*b^*$ space. At step S205, the converted $L^*a^*b^*$ value is written into a corresponding CMYK position. The process from steps S201 to S205 is repeatedly executed until the process for all the colors is completed.

Figure 21:
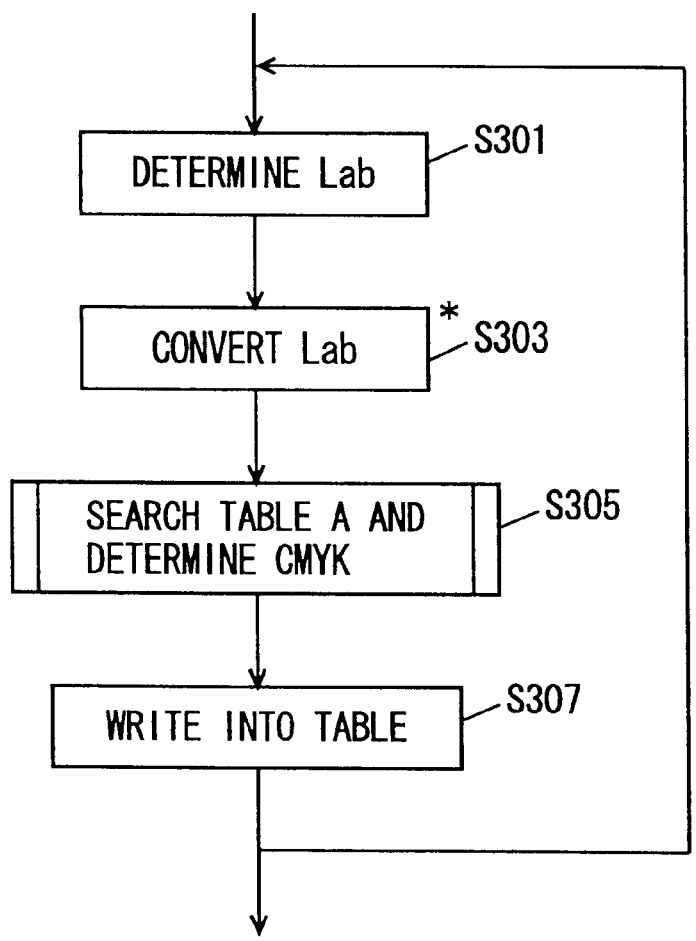
FIG. 21 is a flow chart corresponding to a Table B generation process (S9) of FIG. 4 according to the fourth embodiment.

FIG. 21 is a flow chart corresponding to the Table B generation process (S9) of FIG. 4 according to the fourth embodiment.

At step S301, the $L^*a^*b^*$ value that is to be registered on Table B is determined. The $L^*a^*b^*$ value with an appropriate interval is determined since the entire registration of all $L^*a^*b^*$ into Table B is not desirable from the standpoint of the memory size. At step S303, a conversion similar to that of step S203 of FIG. 6 is applied on the determined $L^*a^*b^*$. At step S305, a search is performed in Table A to determine the $L^*a^*b^*$ value that is closest to the converted value. The corresponding CMYK value is determined.

At step S307, the $L^*a^*b^*$ value after conversion and the CMYK value are written into Table B.

By this process, a Table B required to convert from $L^*a^*b^*$ to CMYK is generated.

The CMYK value determination process carried out at step S305 of FIG. 21 is similar to the process of the flow chart of FIG. 8.

Figure 22:
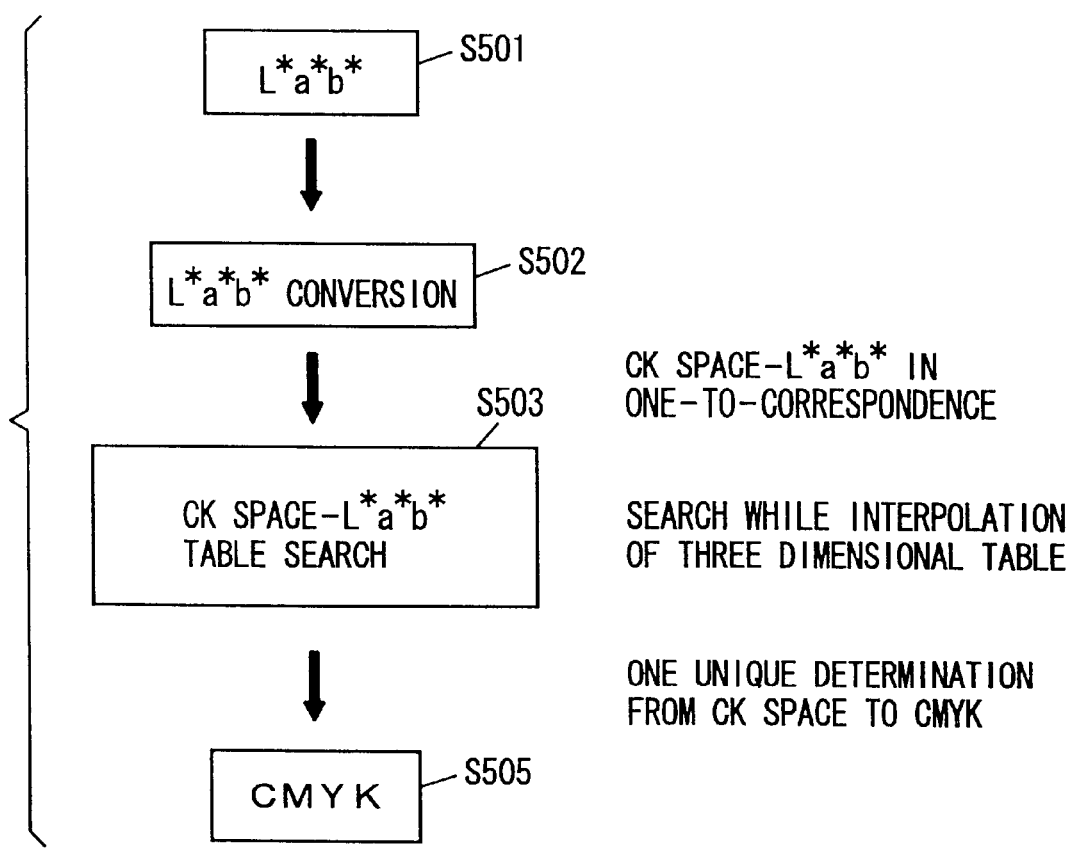
FIG. 22 is a flow chart of a color conversion process according to the fourth embodiment.

FIG. 22 is a flow chart of a color conversion process carried out by the image processing apparatus of FIG. 1.

At step S501, the $L^*a^*b^*$ value that is the subject of conversion is input. At step S502, a conversion similar to that of step S203 of FIG. 6 is applied on the input value.

At step S503, a search is performed in the table to read out the CMYK value corresponding to the converted $L^*a^*b^*$ value. The read out CMYK value is output at step S505.

The characteristics of the color conversion process carried out by the image processing apparatus of the present embodiment will be described hereinafter. The color conversion of the present embodiment includes the following characteristics of (1) and (2).

(1) Gamut mapping and color conversion are carried out at the same time.

Conversion from $L^*a^*b^*$ to CMYK corresponds to retrieving an appropriate CMYK value with respect to the applied $L^*a^*b^*$. By searching for the CMYK value that is closest to the applied color $L^*a^*b^*$, the CMYK with the matching $L^*a^*b^*$ in the gamut is determined. For values outside the gamut, a combination of CMYK that has the closest $L^*a^*b^*$ is searched for.

Thus, it is no longer necessary to determine whether the applied $L^*a^*b^*$ is inside or outside the gamut, and convert the value, when outside the gamut, to an appropriate $L^*a^*b^*$ in the gamut. Furthermore, the continuity inside and outside the gamut can be maintained automatically.

(2) Gamut mapping is conducted in an intentionally distorted space.

Gamut compression and color conversion can now be carried out at one time in one operation in the present embodiment as described above. However, the mapping is still only effective to minimize the color difference as in conventional art if not further particular measures are taken. In the present embodiment, the $L^*a^*b^*$ space is distorted (deformed) in advance. Therefore, intentionally operated mapping can be conducted while using the method of the search for the smallest color difference (=while conducting gamut compression and color conversion simultaneously).

Any CMYK that has a matching $L^*a^*b^*$ in a space that is not distorted will similarly have a matching $L^*a^*b^*$ in a distorted space. Therefore, the color in the gamut is converted properly even if color conversion is conducted in a distorted space. Specifically, conversion into a combination of CMYK having an $L^*a^*b^*$ equal to the applied $L^*a^*b^*$ is effected. The color reproduction range will not be reduced.

Figure 30:
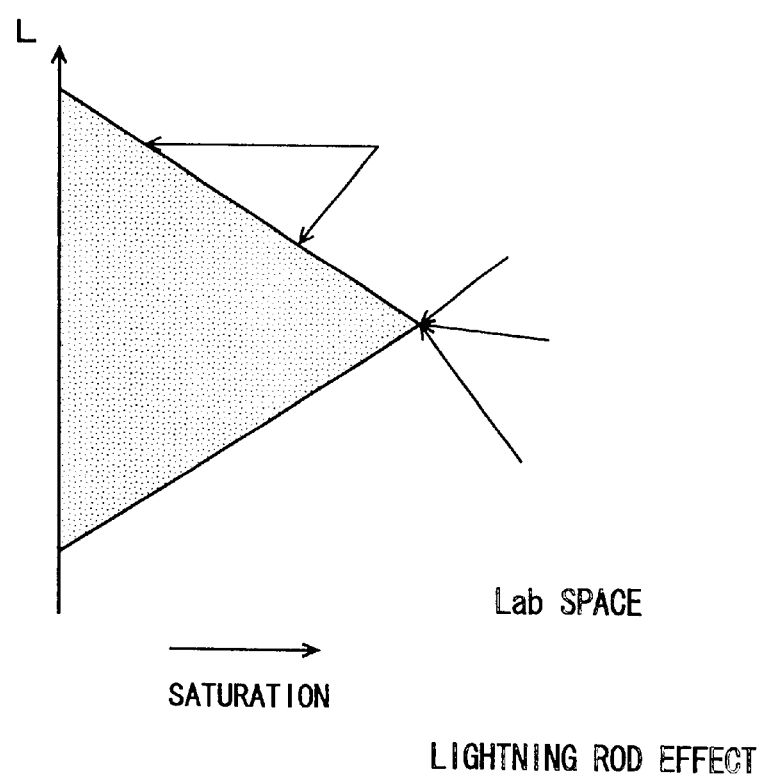
FIG. 30 is a diagram to describe the problems in conventional gamut mapping.

A phenomenon called "lightning rod effect" shown in FIG. 30 was noted in conventional art. The gamut range of a printer or the like often has a sharp edge in an acute angle. If points outside the gamut are mapped at the closest area in the gamut, there is a problem that the gamut will have many colors mapped at the acute region.

This lightning rod effect problem can be avoided by the approach of effecting mapping that sets the lightness constant. However, this approach is disadvantageous in that the color will be mapped to a too-different color.

Figure 23:
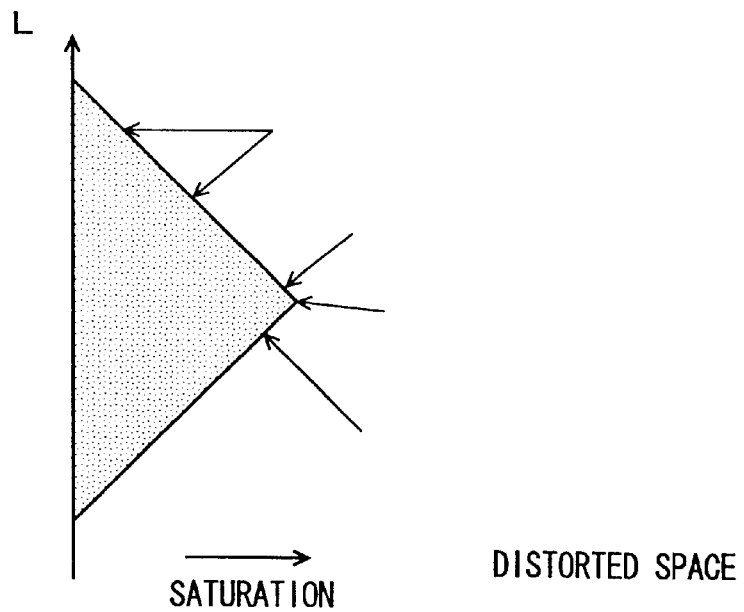
FIGS. 23 and 24 show specific examples of a distorted space.

In the present embodiment, a gamut such as that shown in FIG. 30 is converted so as to be compressed in the direction of saturation, as shown in FIG. 23. By conducting mapping so that the color difference is minimized, congregation of mapping at the acute region of the gamut can be avoided. This mapping allows a more approximating color as compared to mapping of a constant lightness.

Figure 24:
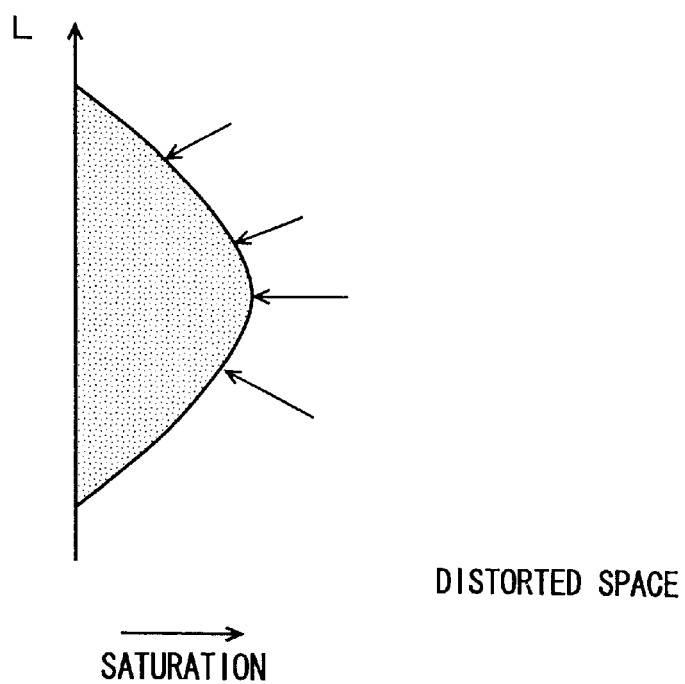

Congregation of the mapping points can further be prevented by a conversion as shown in FIG. 24. The degree of distortion is increased in proportion to a higher saturation.

A similar advantage can be obtained by an $L^*a^*b^*$ conversion that applies distortion causing the gamut to extend in the direction of lightness.

Figure 25:
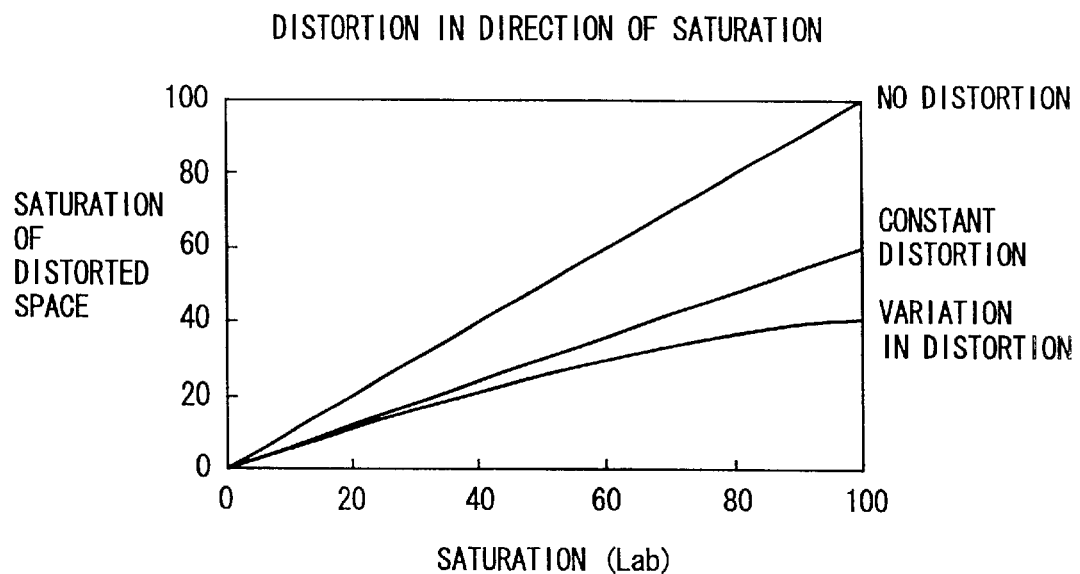
FIG. 25 is a diagram to describe distortion in the direction of saturation.

FIG. 25 is a diagram to describe a method to set distortion in the direction of saturation.

The graph in FIG. 25 exhibits a straight line if the distortion is set constant at all saturation as in FIG. 23. The graph exhibits a curve if the distortion level is altered to become greater in proportion to a higher saturation as shown in FIG. 24.

In many printers, the saturation peak is located at the darker color as compared to the display. In general, a more favorable color conversion result is obtained by conducting mapping so that a clear and bright color is given weight to vividness even at the sacrifice of lightness continuity, and a dark color is given weight to lightness even at the sacrifice of saturation.

Figure 26:
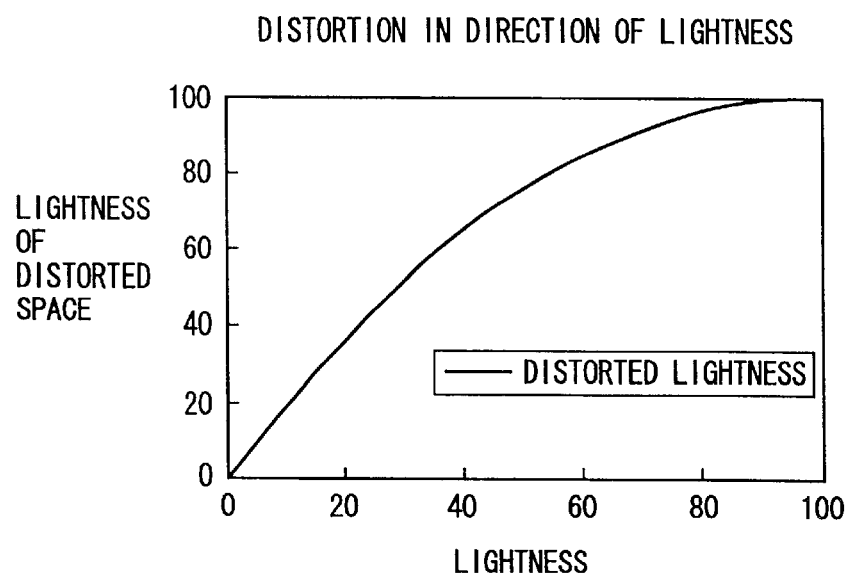
FIG. 26 is a diagram to describe distortion in the direction of lightness.

In order to realize such a mapping, a space deformed so that distortion is increased as a function of an intermediate point of lightness as shown in FIG. 26 is employed. A similar effect can be obtained by a distortion in the direction of saturation.

In all deformations of space in the present embodiment, colors residing in the gamut are subjected to a conversion similar to that carried out in a space that is absent of distortion. Furthermore, a conversion that satisfies the continuity inside and outside the gamut can be effected.

It is known that a bright blue outside the gamut is preferably converted to a color biased to cyan in proportion to higher saturation as compared to the conversion to the color of purple that is closer in chromaticity (blue shift phenomenon). As to colors residing in the gamut, direct conversion to CMYK matching L*a*b* is preferable.

Figure 27:
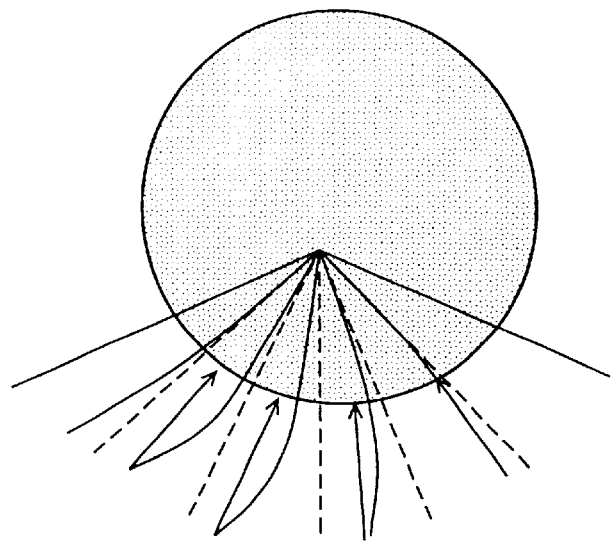
FIG. 27 is a diagram to describe a distorted space to solve blue shifting.
Figure 28:
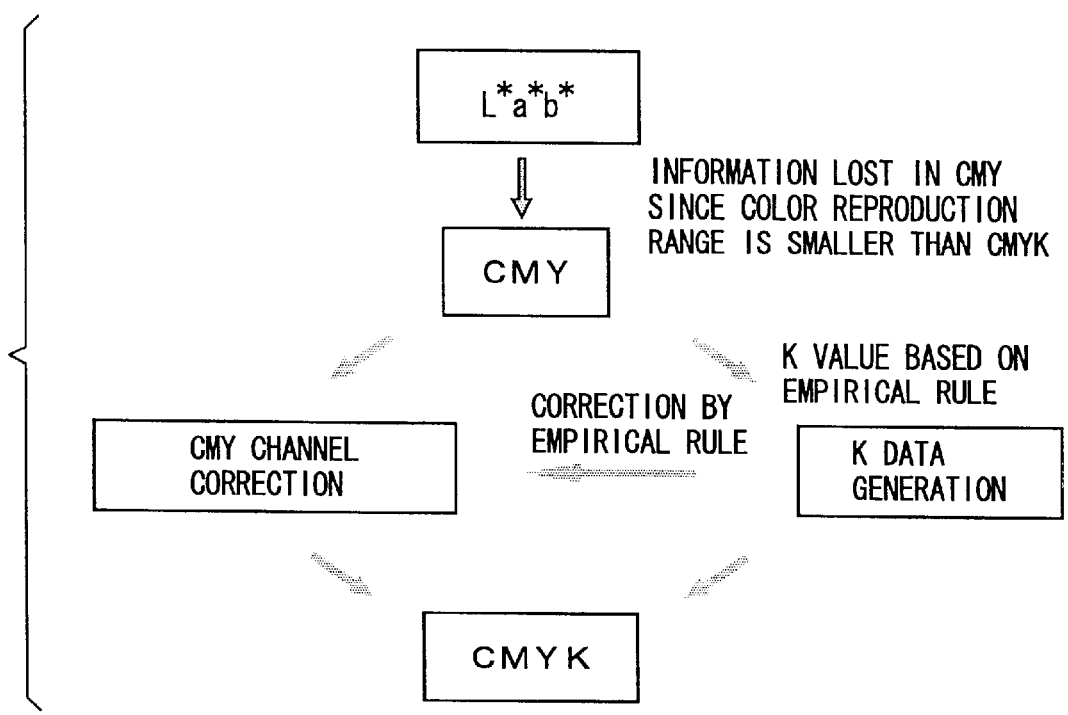
FIG. 28 is a diagram to describe conventional art.
Figure 29:
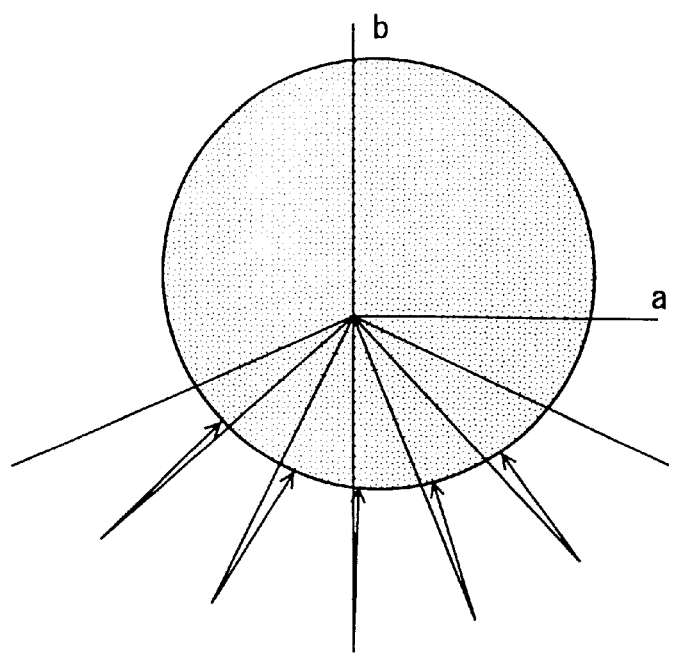
FIG. 29 shows a specific example of gamut mapping.

A conversion that satisfied these two requirements can easily be implemented by employing a space that has the isochromatic lines intentionally distorted. Specifically, only the space in the proximity of blue is to be distorted so that mapping is effected biased towards cyan as a function of a more vivid color outside the gamut, as shown in FIG. 27.

Fifth Embodiment

The hardware of a printer can be configured as shown in FIG. 19 as a fifth embodiment of the present invention.

The printer of the fifth embodiment provides a printout of a color image through the color conversion process of the fourth embodiment.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A color conversion table generation method comprising the steps of:
   (a) printing out a plurality of colors determined in a color space formed of a plane indicating a cyan component and a magenta component, a plane indicating a magenta component and a yellow component, a plane indicating a yellow component and a cyan component, and a gray component that is not in parallel with any of said planes;
   (b) reading out color of each color printed out at said step (a); and
   (c) generating a table in which each colorimetric result obtained at said step (b) and each said color determined on said color space are in correspondence.

2. The color conversion table generation method according to claim 1, wherein said step (c) comprises the steps of
   (c-1) generating a first table indicating a correspondence between said plurality of colors determined and the colorimetric result of said step (b), and
   (c-2) generating a second table required to convert a color represented in a predetermined color space into a color represented by cyan, magenta, yellow, and gray components based on said first table.

3. The color conversion table generation method according to claim 2, wherein said predetermined color space is an L*a*b* color space.

4. The color conversion table generation method according to claim 3, wherein said step (c-2) includes the steps of
   (c-2-1) determining one point in said L*a*b* color space,
   (c-2-2) reading out data approximating data indicated by said one point in the L*a*b* color space determined at said step (c-2-1) from the calorimetric result of said first table, and
   (c-2-3) determining a color component corresponding to said one point in the L*a*b* color space determined at said step (c-2-1) using data read out at said step (c-2-2).

5. The color conversion table generation method according to claim 1, wherein the gray component in said color space is orthogonal to all of said planes.

6. The color conversion table generation method according to claim 1, wherein the gray component in said color space is not orthogonal to at least one of said three planes.

7. A computer-readable recording medium in which is recorded a color conversion table generated by the color conversion table generation method of claim 1.

8. A color conversion table generation program to cause a computer to execute the color conversion table generation method of claim 1.

9. A color conversion table generation apparatus comprising:
   a printer for printing out a plurality of colors determined in a color space formed of a plane indicating a cyan component and a magenta component, a plane indicating a magenta component and a yellow component, a plane indicating a yellow component and a cyan component, and a gray component that is not in parallel with any of said planes;
   a colorimetry portion for reading out color of each color printed out at said printer; and
   a table generation portion for generating a table in which each calorimetric result obtained at said colorimetry portion and each said color printed out by said printer and determined on said color space are in correspondence.

* * * * *